(12) United States Patent
Choi

(10) Patent No.: US 11,500,483 B2
(45) Date of Patent: Nov. 15, 2022

(54) MOUSE PAD

(71) Applicant: TECAM GmbH, Oberursel (DE)

(72) Inventor: Yong-Jae Choi, Oberursel (DE)

(*) Notice: Subject to any disclaimer, the term of this patent is extended or adjusted under 35 U.S.C. 154(b) by 0 days.

(21) Appl. No.: 17/715,209

(22) Filed: Apr. 7, 2022

(65) Prior Publication Data

US 2022/0334657 A1 Oct. 20, 2022

(30) Foreign Application Priority Data

Apr. 14, 2021 (EP) .................... 21168338

(51) Int. Cl.
*G06F 3/039* (2013.01)
*G06F 3/045* (2006.01)
*G06F 3/044* (2006.01)
*G06F 3/04886* (2022.01)

(52) U.S. Cl.
CPC ............ *G06F 3/0395* (2013.01); *G06F 3/044* (2013.01); *G06F 3/045* (2013.01); *G06F 3/04886* (2013.01)

(58) Field of Classification Search
None
See application file for complete search history.

(56) References Cited

U.S. PATENT DOCUMENTS

| 6,369,795 B1 | 4/2002 | Lester et al. | |
| 2005/0036814 A1* | 2/2005 | Sim | G06F 3/0219 400/472 |
| 2006/0152484 A1* | 7/2006 | Rolus Borgward | G06F 3/038 345/157 |
| 2009/0172422 A1* | 7/2009 | Campesi | G06F 3/0213 710/1 |
| 2011/0175567 A1* | 7/2011 | Kidakarn | H02J 50/005 320/108 |

FOREIGN PATENT DOCUMENTS

| DE | 4418371 A1 | 2/1995 |
| DE | 29804165 U1 | 5/1998 |
| WO | WO 0195082 | 12/2001 |

OTHER PUBLICATIONS

English Specification of DE4418371A1.
English Specification of DE29804165U1.

* cited by examiner

*Primary Examiner* — Stephen T. Reed
(74) *Attorney, Agent, or Firm* — Antonio Ha & U.S. Patent, LLC

(57) ABSTRACT

According to an embodiment, a mousepad comprises a cover layer and an integrated keypad. The cover layer has a lateral extension and an upper surface which is usable for placement (placing, putting down) of a computer mouse. The keypad covers a part of said lateral extension. In an area not covered by the keypad there is a mouse parking area. The mousepad comprises a mouse detector associated with the mouse parking area and a corresponding control unit. The control unit is configured such that the keyboard gets activated when the mouse is inside the mouse parking area and gets deactivated when the mouse is outside the mouse parking area.

15 Claims, 1 Drawing Sheet

MOUSE PAD

CROSS-REFERENCE TO RELATED APPLICATION

This application claims priority to European Patent Application No. 21168338.8 filed on Apr. 14, 2021, the disclosure of which is incorporated by reference herein in its entirety.

TECHNICAL FIELD

The invention relates to a mousepad.

DISCUSSION OF RELATED ART

Although many of today's computers and smart devices, such as personal computers, laptops, tablets, and smartphones, have touchscreens, a computer mouse is still a preferred means of input for many tasks. A mousepad generally eases usage of such a mouse. Similarly, a separate keyboard can be handy for entering text in certain situations. However, such external keyboards are rather bulky and inconvenient to carry.

SUMMARY

It is therefore an objective of the invention to provide a lightweight and portable peripheral device which provides support for different kinds of input into an associated computer.

According to the invention, the objective is met by a mousepad comprising a cover layer and an integrated keypad. The cover layer has a lateral extension and an upper surface which is usable for placement (placing, putting down) of a computer mouse. The keypad covers a part of said lateral extension.

In an area not covered by the keypad there is a mouse parking area.

The mousepad comprises a mouse detector associated with the mouse parking area and a corresponding control unit.

The control unit is configured such that the keyboard gets activated when the mouse is inside the mouse parking area and gets deactivated when the mouse is outside the mouse parking area.

Hence, the mousepad according to the invention also serves as a keypad when required, wherein during active mouse usage almost the entire surface area on the cover can be used for mouse movement, while the keypad gets activated if and only if the mouse is placed in the parking area, preferably in one of the corners of the mousepad. The mousepad can be equipped with beneficial additional functions as described below.

This solution is of particular advantage for users who mainly use a mouse as input device and only on occasion switch to the integrated keypad, for example to enter passwords, some searching keywords and/or short messenger or email texts. Writers and heavy email communicators will prefer to use normal bulky keyboards.

In a preferred embodiment, the mousepad comprises illuminants for lighting the keypad, wherein the control unit is configured such that the illuminants get activated when the mouse is inside the mouse parking area and get deactivated when the mouse is outside the mouse parking area. Thus, the active/inactive state of the keypad is automatically visualized by the switched-on or off illumination.

Preferably the illuminants comprise a number of LEDs, and the illuminants are preferably arranged in an illuminating layer below the touchpad layer, which is expediently of a resistive or capacitive type. The control unit is preferably arranged in a housing at the rear edge of the cover layer.

Mouse detection in the parking area is preferably based on an inductive/magnetic working principle, and the mouse detector therefore comprises an electric detection coil below the cover layer.

The mousepad advantageously comprises means for coupling the integrated keypad with an associated external computer by virtue of an USB cable or a wireless transmitter, such that input received by said keypad, when activated, is transferred and entered to said external computer.

Expediently, the housing further comprises a number of sockets, in particular USB sockets, for plugging in external peripheral devices, wherein the control unit provides docking services for coupling said devices to said associated external computer. There may also be a SD card reader integrated into the housing. A combined docking function makes it easier to use USB sticks and SD cards.

Furthermore, the cover layer preferably comprises a hotkey area with a number of hot keys which are always active, no matter where the mouse is located, wherein advantageously the hotkey area is much smaller than the total area of the cover layer, and wherein expediently the hotkey area forms a narrow band or stripe alongside a side edge of the mousepad.

Preferably, the illuminating layer comprises LEDs or other illuminants of different colors, wherein the control unit sets different color tones or shadings dependent on its state or setup.

In yet another advantageous embodiment the control unit comprises gesture recognition with respect to finger gestures sensed by the touchpad layer.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION

A preferred embodiment of the invention is now explained with reference to the accompanying drawings. In connection with the dependent claims this will reveal further objects, features, variants, and advantages of the invention.

Figure 1:
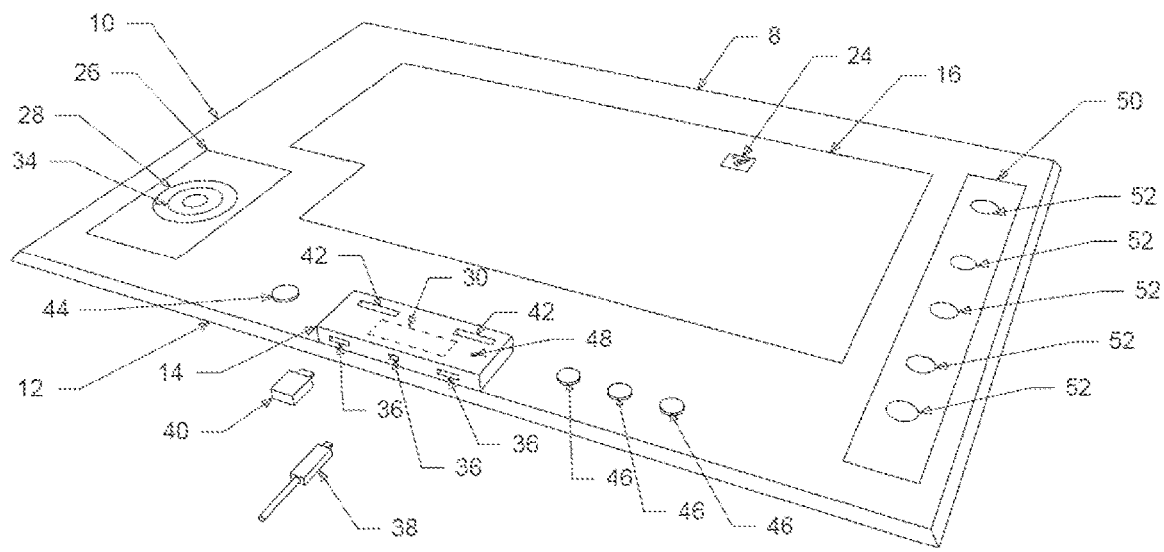
FIG. 1 is a view illustrating a mousepad according to an embodiment of the disclosure.

A mousepad according to the invention is shown schematically in FIG. 1 in a perspective view.

Figure 2:
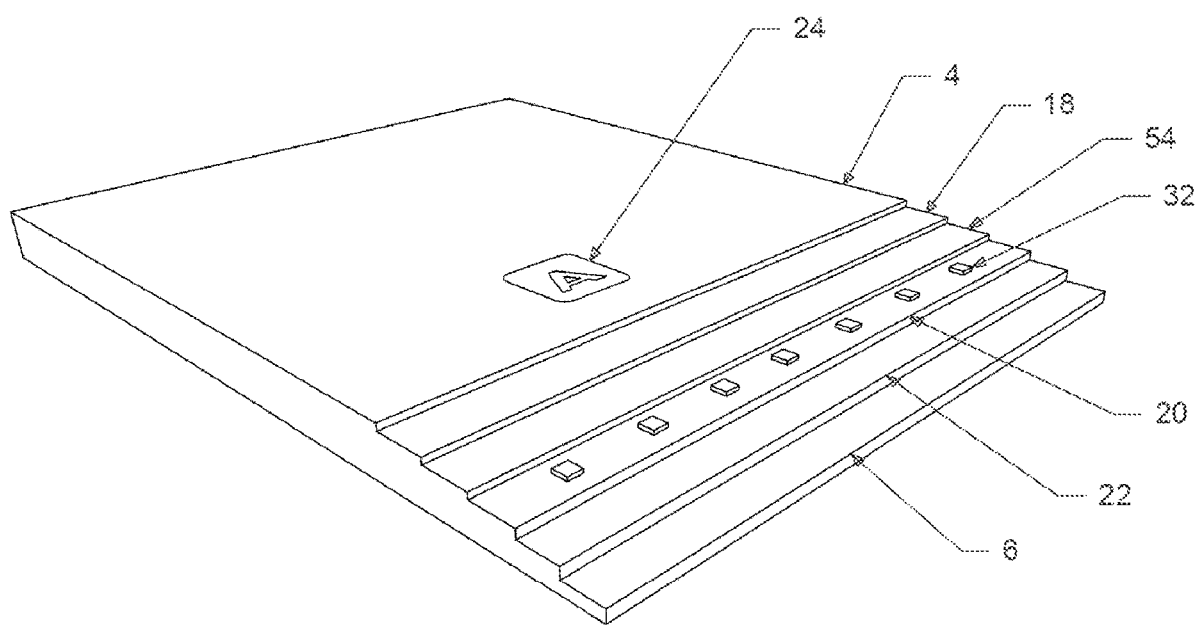
FIG. 2 is a partial cross-sectional view illustrating a mousepad according to an embodiment of the disclosure.

A schematic (partial) cross section of the mousepad is shown in FIG. 2.

In general, the mousepad 2 is configured as a thin rectangular board or sheet with a preferably relatively soft cover layer 4 or cover at the upper side and with a bottom side which preferably comprises a non-slippery rubber layer 6 or a similar (non-slippery). The cover layer 4 is preferably made of plastic or any other suitable material. Looking from above, the mousepad 2 comprises a front edge 8, two side edges 10 and a rear edge 12, wherein the front edge 8 faces the user during intended usage. The four corners may be ergonomically rounded or not.

Overall, with respect to usage of a corresponding computer mouse (or briefly: mouse), the mousepad 2 looks and feels like a conventional mousepad. That is, the mousepad 2 acts as a support pad for a computer mouse which is used as a peripheral input device for an associated computer, for example a desktop personal computer, a laptop, a tablet computer or even a smartphone. The computer mouse usually is an optical mouse with an optical position and/or movement sensor, and the surface of the cover layer 4 supports accurate working of said position sensor. Said surface is preferably mat and smooth for convenient mouse usage without leaving stains. Furthermore, the cover layer 4 is preferably at least partially transparent or permissive for light shining from below, as explained further below. Apart from a negligibly small (compared to the total mousepad area) area at the rear edge 12, which provides a housing 14 for electronic control components and for electrical connection sockets, the entire rectangular cover layer 4 is available for mouse placement and movement.

To provide additional input functions with respect to the associated computer, the mousepad 2 comprises an integrated keypad 16 or touchpad. Therefore, a keypad layer or touchpad layer 18 is arranged inside the mousepad 2, below the cover layer 4 to capture typed user input on demand. Further below the touchpad layer 18 is an illuminating layer 20 to provide backlight shining (at least partially at certain spots) through the touchpad layer 18 and the cover layer 4 when activated. Below the illuminating layer 20 there is a bottom layer 22 to provide mechanical stability. In the example shown in FIG. 2, the rubber layer 6 already mentioned forms the lowermost layer. This rubber layer 6 may be arranged as a coating on the lower surface of the bottom layer 22. In other embodiments, the bottom layer 22 itself may be the lowermost layer. A separate rubber layer 6 may not be necessary.

The touchpad layer 18 may extend over a substantial area below the cover layer 4 to provide—in connection with an associated control unit 30—a full format keypad 16. The touchpad layer 18 itself is preferably only a sheet without any key pattern contained in its structure. It gives a touch point information, for example as x-y coordinates, to the control unit 30 when touched by finger. In the control unit 30 the coordinates are then translated into information which key is pressed with the help of a stored table of the key pattern or keypad geometry. The key pattern is preferably visually indicated to the user, for example as imprint, or engraving or the like, in particular as a separate (intermediate) layer or as a part of the cover layer 4 or on the touchpad layer 18. In a preferred simple embodiment this is achieved as an imprint on the cover layer. For example, the keypad layout, in particular the lettering or inscription and possibly key boundaries, may be printed on the lower surface (bottom side) of the cover layer 4, namely in a flipped manner, such that it appears in the usual true-sided way when viewed from above. From the user's view, the touchpad layer 18 together with the printed inscription and the cover layer 4—on which he/she actually places his/her fingers—forms a keypad 16.

This keypad 16 preferably comprises the common keys of the alphabet plus a number of common control keys, and preferably numeric keys as well. The keypad 16 is stretched out across the mousepad area such the keys 24 (only one of which is schematically shown here) are relatively large in size and therefore convenient to use during two-handed typing. However, there is at least one area on the cover devoid of any keypad function which serves as a mouse parking area 26. The mouse parking area 26 is preferably arranged within a corner area of the mousepad 2, in the example shown here (in case of a right-handed model) in the upper right corner when viewed from the intended user position.

In a more advanced embodiment based on liquid crystal displays (LCDs) or other kinds of display, the keypad layout may be programmable, allowing for changing the keypad layout (for example language and keypad pattern) by a bundled software.

A crucial feature of the mousepad 2 is that there is an integrated mouse detector 28 or sensor which detects whether a mouse is placed on the parking area 26 or not. An integrated control unit 30 with suitable electronics which is coupled to said sensor switches off or deactivates the keypad 16 when the mouse has left the parking area 26. Conversely, the control unit switches on or activates the keypad function when the mouse is detected or sensed in the parking area 26. Therefore, when the mousepad 2 is used as a full-sized mousepad with the mouse placed outside of the parking area 26, the keypad 16 is deactivated or paused such that the user cannot type or enter text into the associated computer by inadvertently pressing the corresponding touchpad buttons or keys 24. If on the other hand, the moused is parked in the parking area 26, the integrated control unit 30 automatically activates the keypad 16, such that the user can enter text.

To assist the user during text input, the illuminating layer 20 is switched on and off by the control unit 30 essentially simultaneously with the keypad 16. That is, whenever the keypad 16 is active it is illuminated (backlit) by the illuminating layer 20 such that the individual touch keys 24 are clearly indicated visually. Conversely, if the keypad 16 is inactive, the illumination is preferably switched off as well, to indicate the inactive state of the keypad 16. To sum it up, depending on the keypad state the illumination layer 20 and therefore also the at least partially transparent cover layer 4 can be bright or dark and can show the keypad pattern beneath the cover layer 4 or not.

In a preferred embodiment the touchpad layer 18 is based on a resistive working principle (i.e., resistive touchpad) which is an easy an affordable way to sense fingers pressing the individual keys 24. In an alternative preferred embodiment, the touchpad layer 18 is based on a capacitive working principle which is an effective way to sense fingers touching the individual keys 24 and recognizing finger gestures. However, gesture recognition can in principle also be based on resistive sensing technology. In both cases the uppermost cover layer 4 must be configured to support and to "forward" the user input to the touchpad layer 18, which however can be achieved by well-known standard means.

The illuminating layer 20 is preferably realized by a number of, preferably a plurality of light emitting diodes 32 (LEDs) arranged on an according board or plate. Other illuminants preferably arranged in the illuminating layer 20 may be used in addition and/or as an alternative, for example organic LEDs (OLEDs) or backlit liquid crystal displays (LCDs) or black and white e-paper displays (electronic ink). In some of these cases, a transparent cover layer 4 may be expedient. In case a display is used, there may be no need for illuminant layers as the illuminant layer is already a part of display.

A diffusing layer 54 (shown schematically in FIG. 2) above the illuminating layer 20, in particular between the illuminating layer 20 and the touchpad layer 18 may be beneficial for (uniformly) spreading the light of the LEDs 32 or the other illuminants.

The illuminating layer of LEDs 32 may also light up in different colors not only for illuminating the keypad 16 but also for the edges and/or other area and/or patterns of the mousepad 2 for signaling or amusement purpose.

Mouse detection in the parking area 26 is preferably based on an electric/magnetic detection coil 34 arranged beneath the cover layer 4 in connection with a corresponding detection routine in the control unit 30. That is, detection is based on an inductive working principle, reacting on, or sensing metallic parts typically contained in a computer mouse. In an alternative embodiment (not shown here) detection of the mouse is based on an infrared detector (like from a TV remote control). For example, through a small hole in the cover layer 4, protected by a transparent window, infrared light can be emitted in direction above and a sensor next to the infrared emitter can detect the reflection from a mouse. A drawback of this approach is that it will also detect other objects. For example, it might mistake an empty hand for a mouse.

The keypad 16, the mouse detector 28, and the LEDs 32 of the illuminating layer 20 are electrically coupled to an electronic control unit 30 with corresponding electronic circuits within the mousepad 2. The electronic circuits are preferably realized on printed circuits boards (PCBs) and located in a small housing 14 at the rear edge of the mousepad 2, preferably in a central position or alternatively in a corner position.

The rear side of said housing 14 also contains a number of connection sockets 36 which are electrically coupled to the control unit 30. In particular, there is an USB connection socket 36 (preferably of the Micro USB-B type) for connecting the integrated keypad 16 and possibly other devices within the mousepad 2 to an associated computer by virtue of a corresponding USB cable 38, such that typed input entered via the keypad 16 in its active state and possibly other data are transferred to or exchanged with the computer. This USB connection may also be used to power the electronic circuits or electric devices, in particular the keypad 16 and the LEDs 32, within the mousepad 2. Because Micro USB-B is the most common for this kind of connection, there is preferably at least one such socket 36 which can be used to connect the mousepad 2 with an associated computer. For maximum flexibility, there can be other types as well, such as USB-A or USB-C.

Instead of a USB cable 38 a wireless USB-plug transmitter may be used to establish a wireless connection of the mousepad 2 to an associated transmitter plugged into a USB socket of the corresponding computer. In this case, in particular, but also in other embodiments it may be advantageous if the mousepad 2 comprises a self-contained power supply with a (preferably rechargeable) battery or an accumulator to be inserted or integrated into a suitable compartment, in particular within the housing 14. The battery or accumulator may be charged via a USB cable 38 plugged into a corresponding socket 36 in the housing 14. The charging control is preferably integrated into the control unit 30. Optionally, this system may also act as a power bank with the help of a suitable electronic circuit arrangement.

A wireless mouse transmitter can also be integrated in the electronics for bundling the mouse in order to provide one more free USB socket 36, for example of type USB-A and/or USB-C. Preferably, there are at least two USB sockets 36, and one socket 36 will usually be used for the external wireless mouse transmitter 40. Users can use any existing wireless mouse with corresponding USB mouse transmitter 40.

Any free USB socket 36 in the housing can be used to attach any kind of usual peripheral USB device which will interact with the associated computer via the USB connection mentioned above. Therefore, the mousepad 2 can be regarded as a docking station for peripheral devices interacting with the associated computer, for example, desktop personal computer (PC), laptop or notebook, tablet, or smartphone.

In a preferred embodiment there is an SD card reader 42 with corresponding socket integrated into the housing 14, for example on top or at the rear side, and coupled to the internal electronics to allow for reading and writing SD cards and to transfer corresponding data from/to the associated computer via the USB connection described above.

Furthermore, a twitter device 48 arranged in the housing 14 may provide noises or more generally acoustic feedback, for example while typing or while switching from keypad mode to mouse mode or vice versa (e.g., mouse entering or leaving parking area 26). In a more advanced embodiment, there may be a speaker and a microphone integrated into the housing 14, which may be coupled to the associated computer via the USB connection described above.

The housing 14 or some small area in the cover layer 4 beside the housing 14, preferably near the rear edge 12, may also contain an on/off switch 44 for the integrated electronic devices and, if applicable, a number of option switches 46 or buttons to control the behavior of a number of functions controlled by the control unit 30. For example, some of the additional buttons may be used for changing the color and/or brightness of the LEDs 32, or for turning on/off the keypad sound etc.

Functions of the integrated electronics comprise (if applicable):
  Controlling of touchpad
  Detection of mouse parking and leaving
  LED switching and possibly brightness/color control
  USB control and communication with connected computer
  SD card reading and writing
  Making noise through twitter
  Controlling of switches
Preferred technical data of the mousepad are for example:
  Dimension: 350 mm×250 mm×6 mm (13 mm at housing)
  Weight: 500 g
  Power: 5 V DC, 250 mA, preferably from connected computer
Variations and options of the product line may comprise:
  Types and numbers of USB sockets
  Types and numbers of card readers
  Different languages for keypad
  Small size mousepads for mobile phones or tablets
  Microphone/speaker integration for internet meeting or phone program
  Simple version without SD card reader
  Pro-version with micro-SD or other card readers and 4 USB sockets As explained above, the control unit 30 is configured such that as soon as the mouse is placed on the parking area 26 the internal electronics will turn on the keypad function. At the same time, the LEDs 24 or other illuminants in the illumination layer 20 will light on to ease reading or visual identification of the keys 24 on the keypad 16. After finishing text entering, the user may switch to mouse operation. The mouse will therefore leave the parking area 26, and the electronics in the control unit 30 will turn off the keypad function and the illumination, for example the LEDs 32. The user can then use the mousepad 2 as normal mousepad further.

Alongside the keypad 16 described above there may be an additional small keypad forming a 'hotkey area' 50 with frequently used keys like del, back, arrows, esc, ctr-c, ctr-v, etc. These keys ('hot keys' 52) are preferably always activated no matter where the mouse is located. Thus, input entered via the hot keys 52 is always transferred to the associated coupled computer. Alternatively, there may be a "toggle on/off" switch among the options switches 46 or buttons for manual activation/deactivation of the hot keys 52. The hot keys 52 are preferably located in a small area near one of the side edges 10 of the mousepad 2, in particular the side edge 10 opposite to the side edge 10 limiting the mouse parking area 26. That is, the hot key area 50 is near the left-side edge 10, when the mouse parking area 26 is near the right-side edge 10 (for a typical right-handed user) and vice versa. Preferably, the hot key area 50 has the shape of a narrow band or stripe aligned in parallel with the according side edge 10 and with the individual hot keys 52 preferably arranged on top of each other, as shown exemplarily in FIG. 1, and not side by side. Hence, the hot key area 50 is small in comparison to the total mousepad area and the total area of the keypad 16. Of course, the hotkey area 50 and the area of the keypad 16 should not overlap. Neither should the hotkey area 50 and the mouse parking area 26.

The hot keys 52 can be realized in a similar manner like the keys 24 of the keypad 16, namely by a separate (and preferably independently controllable) portion of the touchpad layer 18 in this particular area below the cover layer 4, and preferably with a separate portion of the illuminating layer 20 further below. The portion of the illumination layer 20 associated with the hotkey area 50 is preferably independently controllable from the portion associated with the keypad 16. That is, the hotkey area 50 may be enlightened all the time, in contrast to the area of the keypad 16 which, as discussed above, is preferably enlightened if and only if the keypad 16 is actively receiving and forwarding typed input. Of course, more complex enlightening schemes are possible for both the keypad 16 and the hotkey area 50, for example comprising optic feedback, when a certain key is touched or pressed.

In a simple version of the mousepad 2, the LEDs 32 only have one color. In an extended version there may be LEDs (or other illuminants) with different colors, for example Red, Green, Blue (RGB). Thus, by suitable control via the control unit 30 different colors can be set for various states. By the principle of additive mixing of color various color tones or color shadings can be achieved. Hence, different colors of the illumination can be used for signaling different setups or states.

A preferred example of this feature is related to the keypad language. In general, with a printed keypad layout as described above, switching the visible letter inscription is not easily possible. However, it is possible to print several inscriptions on the according key area. For example, in case of Korean, Japanese and some other countries, US English is the basic keypad layout. Corresponding inscriptions may be printed in the middle or in one corner of the according keys. Local language letters or key assignments may be printed additionally in the (other) corner(s) of each key. Thus, the same key is working for two or more letters by switching language mode. Each language mode is preferably assigned a different color scheme of the LEDs 32 by the control unit 30. The color changing will then indicate the current language mode to the user to prevent mistakes. Similarly, a German keypad, for example, can contain an additional English inscription, wherein different backlight colors indicate which language is currently used.

Furthermore, the control software implemented in the control unit 30 may comprise gesture recognition in order to identify finger gestures received by the touchpad layer 18. For example, the control software will recognize if one key is pressed and released once, or one point is pressed and moved with retaining pressure alongside some direction. Recognized gestures may be translated into control sequences for the coupled computer, for example for scrolling, zooming, or switching windows on the computer desktop. In particular, it may be convenient to allow for changing language mode (as discussed above) by recognizing an according gesture, for example on the space bar area of the keypad 16.

While the disclosure has been shown and described with reference to exemplary embodiments thereof, it will be apparent to those of ordinary skill in the art that various changes in form and detail may be made thereto without departing from the spirit and scope of the disclosure as defined by the following claims.

What is claimed is:

1. A mousepad, comprising:
a cover layer and an integrated keypad, the cover layer having a lateral extension and an upper surface which is usable for placement of a computer mouse, wherein the keypad covers a part of said lateral extension,
wherein in an area not covered by the keypad there is a mouse parking area,
wherein the mousepad comprises a mouse detector associated with the mouse parking area and a corresponding control unit, and
wherein the control unit is configured such that the keypad gets activated when the mouse is inside the mouse parking area and gets deactivated when the mouse is outside the mouse parking area.

2. The mousepad according to claim 1, comprising illuminants for lighting the keypad, wherein the control unit is configured such that the illuminants get activated when the mouse is inside the mouse parking area and get deactivated when the mouse is outside the mouse parking area.

3. The mousepad according to claim 2, wherein the illuminants comprise a number of LEDs.

4. The mousepad according to claim 1, wherein the keypad comprises a resistive or capacitive touchpad layer below the cover layer.

5. The mousepad according to claim 2, wherein the illuminants are arranged in an illuminating layer below the touchpad layer.

6. The mousepad according to claim 1, wherein the control unit is arranged in a housing at a rear edge of the cover layer.

7. The mousepad according to claim 1, wherein the mouse detector comprises an electric detection coil.

8. The mousepad according to claim 1, having means for coupling said keypad with an associated external computer by virtue of an USB cable or a wireless transmitter, such that input received by said keypad, when activated, is transferred and entered to said external computer.

9. The mousepad according to claim 6, wherein the housing comprises a number of sockets, in particular USB sockets, for plugging in external peripheral devices, and wherein the control unit provides docking services for coupling said devices to said associated external computer.

10. The mousepad according to claim 6, wherein the housing comprises a SD card reader.

11. The mousepad according to claim 1, wherein the keypad covers a substantial part of said lateral extension of the cover layer.

12. The mousepad according to claim 1, wherein the cover layer comprises a hotkey area with a number of hot keys which are always active, no matter where the mouse is located.

13. The mousepad according to claim 12, wherein the hotkey area is much smaller than the total area of the cover layer.

14. The mousepad according to claim 12, wherein the hotkey area forms a narrow band or stripe alongside a side edge of the mousepad.

15. The mousepad according to claim 14, wherein the hotkey area and the mouse parking area are arranged at opposite sides of the mousepad, and with the keypad roughly in between.

\* \* \* \* \*